(12) United States Patent
Pan (10) Patent No.: US 10,928,719 B2
(45) Date of Patent: Feb. 23, 2021

(54) PROJECTOR AND ILLUMINATION SYSTEM

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/459,461

(22) Filed: Jul. 1, 2019

(65) Prior Publication Data

US 2020/0012178 A1 Jan. 9, 2020

(30) Foreign Application Priority Data

Jul. 6, 2018 (CN) .......................... 201821064496.9

(51) Int. Cl.
G03B 21/20 (2006.01)

(52) U.S. Cl.
CPC ......... *G03B 21/2066* (2013.01); *G03B 21/20* (2013.01); *G03B 21/204* (2013.01)

(58) Field of Classification Search
CPC ... G03B 21/2066; G03B 21/20; G03B 21/204
USPC .......................................................... 353/84
See application file for complete search history.

(56) References Cited

U.S. PATENT DOCUMENTS

| 9,563,110 B2 | 2/2017 | Ueda | |
|---|---|---|---|
| 2012/0026472 A1* | 2/2012 | Masuda | G03B 21/204 353/85 |
| 2016/0274353 A1 | 9/2016 | Ando et al. | |

FOREIGN PATENT DOCUMENTS

| CN | 102645825 | * 11/2011 |
|---|---|---|
| CN | 103365049 | 6/2015 |
| TW | 201714013 | 4/2017 |
| TW | I628504 | 7/2018 |
| WO | 2012109168 | 8/2012 |

OTHER PUBLICATIONS

Machine Translation of CN 102645825 (Year: 2020).*

* cited by examiner

*Primary Examiner* — Jerry L Brooks
(74) *Attorney, Agent, or Firm* — JCIPRNET (57) ABSTRACT

A projector and an illumination system are provided. The projector includes an illumination system, a light valve, and a projection lens. The illumination system includes a light source configured to provide an illumination beam and a light processing module comprising a reflective wheel structure and a driving unit. The reflective wheel structure includes first and second reflective structures. The first and second reflective structures are located on a transmission path of the illumination beam. The driving unit is connected to the first reflective structure or the second reflective structure and is configured to drive the first and second reflective structures to rotate synchronously. The light valve is located on a transmission path of the illumination beam transmitted from the second reflective structure and configured to convert the illumination beam from the second reflective structure into an image beam.

24 Claims, 6 Drawing Sheets

PROJECTOR AND ILLUMINATION SYSTEM

CROSS-REFERENCE TO RELATED APPLICATION

This application claims the priority benefit of China application serial no. 201821064496.9, filed on Jul. 6, 2018. The entirety of the above-mentioned patent application is hereby incorporated by reference herein and made a part of this specification.

BACKGROUND OF THE INVENTION

Field of the Invention

The invention relates to an image display device and a component thereof. More particularly, the disclosure relates to a projector and an illumination system.

Description of Related Art

A projector is an image display device which generates large-sized image frames. According to an imaging principle of projectors, an illumination beam generated by a light source is converted into an image beam via a light valve, and the image beam is projected onto a screen or a wall through a projection lens.

In terms of a digital light processing (DLP) projection structure, a single color light (e.g., red light, green light, or blue light) is projected onto a digital micro-mirror device (DMD) at a time. Multiple color lights projected onto the DMD sequentially are switched as time so quickly that a full-color dynamic image is created due to the image retention effects of the human eyes. The projector controls the DMD device to provide a synchronized image based on the color of the color light projected onto the DMD at a time. The color lights projected onto the DMD are generated from a laser diode (LD) light source and then transmitted through a phosphor wheel and a color filter wheel. Therefore, the DLP is required to synchronize the LD light source, the phosphor wheel, the color filter wheel, and the DMD. In order to achieve good synchronization effects for these components, a high-level DLP is required. However, these features increase the manufacturing costs of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projector and an illumination system which may be advantageous in manufacturing cost.

Other objectives and advantages of the invention can be further understood through the technical features disclosed in the invention.

In order to achieve one of, a part of or all of the above-mentioned advantages, or to achieve other advantages, an embodiment of the invention proposes a projector including an illumination system, a light valve, and a projection lens. The illumination system includes a light source and a light processing module. The light source is configured to provide an illumination beam. The light processing module includes a reflective wheel structure and a driving unit. The reflective wheel structure includes a first reflective structure and a second reflective structure. The first reflective structure is located on a transmission path of the illumination beam emitted from the light source, and the second reflective structure is located on a transmission path of the illumination beam transmitted from the first reflective structure. The driving unit is connected to the first reflective structure or the second reflective structure and configured to drive the first reflective structure and the second reflective structure to rotate synchronously. The light valve is located on the transmission path of the illumination beam from the second reflective structure and configured to convert the illumination beam from the second reflective structure into an image beam. The projection lens is located on a transmission path of the image beam.

To achieve one or some or all of the objectives above or other objectives, an embodiment of the invention provides an illumination system including a light source and a light processing module. The light source is configured to provide an illumination beam. The light processing module includes a reflective wheel structure and a driving unit. The reflective wheel structure includes a first reflective structure and a second reflective structure. The first reflective structure is located on a transmission path of the illumination beam emitted from the light source, and the second reflective structure is located on a transmission path of the illumination beam transmitted from the first reflective structure. The driving unit is connected to the first reflective structure or the second reflective structure and configured to drive the first reflective structure and the second reflective structure to rotate synchronously.

Based on the above, the embodiments of the invention have at least one of the following advantages or efficacies. The first reflective structure and second reflective structure provided in one or more embodiments of the invention are fixed to each other. Therefore, the light processing module synchronously drives the first reflective structure and the second reflective structure to rotate by using a single driving unit. As such, the projector provided in one or more embodiments of the invention may drive the first reflective structure and the second reflective structure to rotate by using a single driving unit without a high-level DLP conventionally used to synchronize the light source, the first reflective structure, the second reflective structure and the light valve, so as to reduce the manufacturing costs.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. The terms used herein such as "above," "below," "front," "back," "left," and "right" are for the purpose of describing directions in the figures only. Accordingly, the drawings and descriptions will be regarded as illustrative in nature and not as restrictive.

Figure 1:
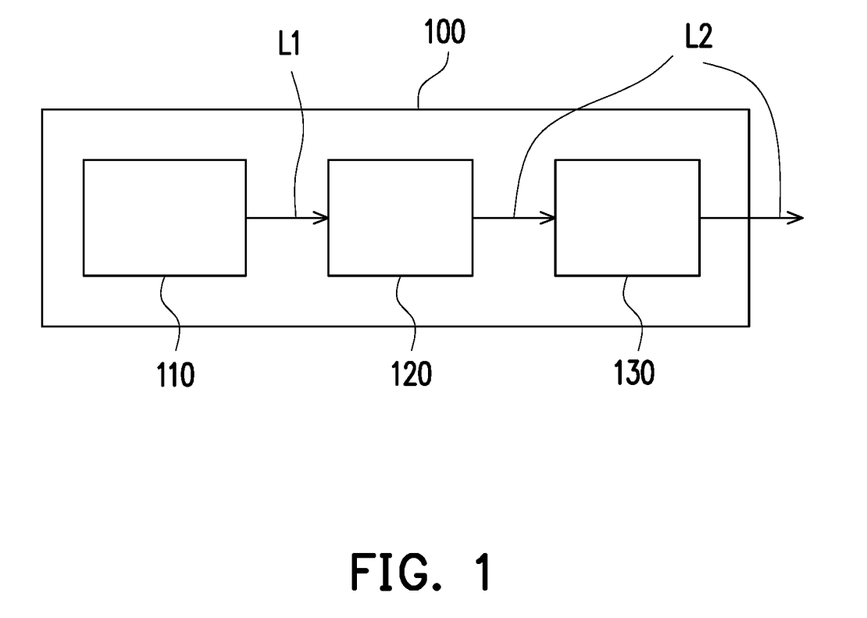
FIG. 1 is a schematic view of a projector according to an embodiment of the invention.

FIG. 1 is a schematic view of a projector according to an embodiment of the invention. With reference to FIG. 1, a projector 100 provided in the embodiment includes an illumination system 110, a light valve 120, and a projection lens 130. The illumination system 110 is configured to provide an illumination beam L1. The light valve 120 may be a DMD, a liquid crystal on silicon (LCoS) panel, or a liquid crystal display panel, and the invention is not limited thereto. The light valve 120 is disposed on a transmission path of the illumination beam L1 and is configured to convert the illumination beam L1 into an image beam L2. The projection lens 130 is disposed on a transmission path of the image beam L2 and configured to project the image beam L2 out of the projector 100.

Figure 2:
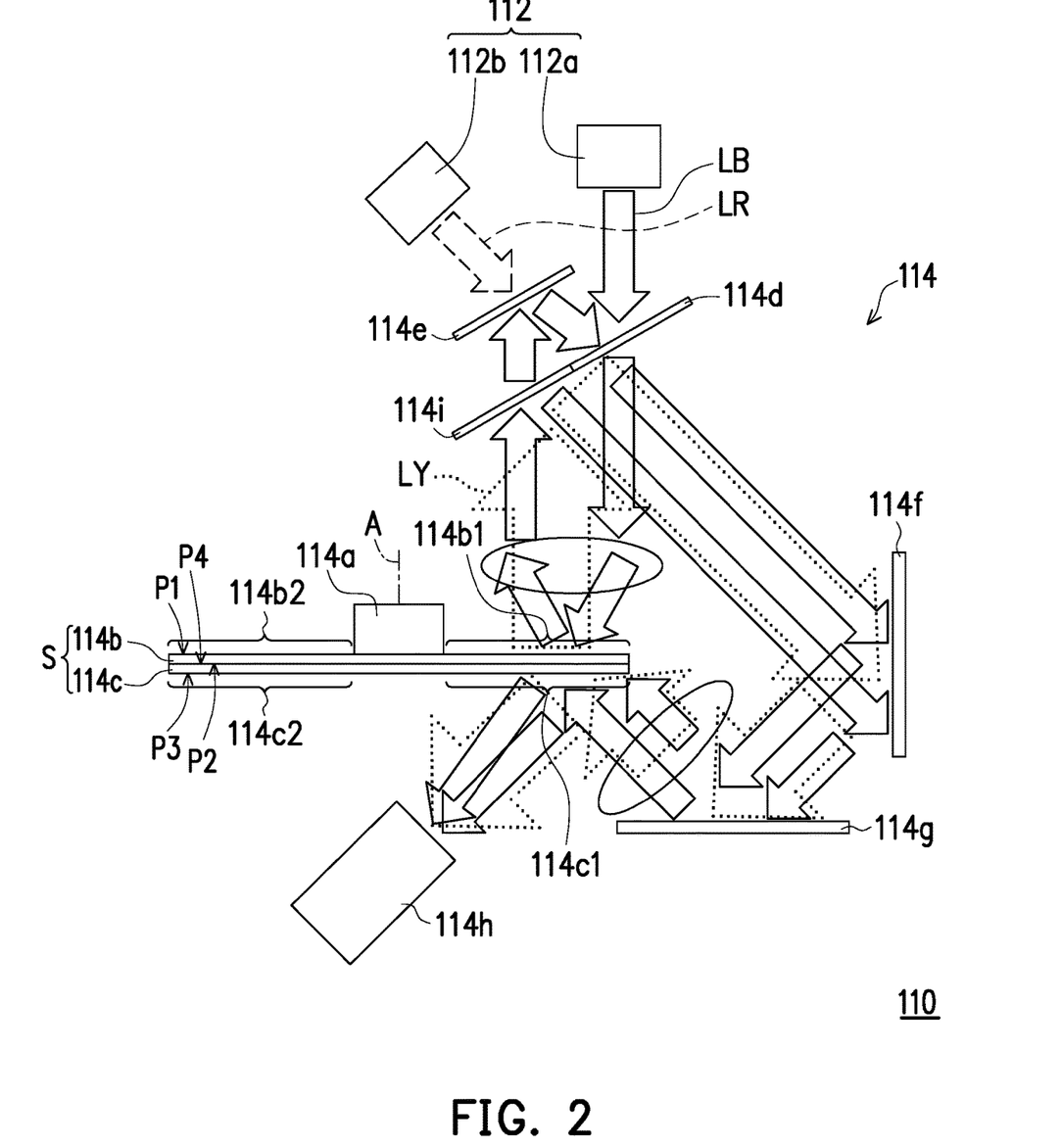
FIG. 2 is a schematic view of the illumination system depicted in FIG. 1.

FIG. 2 is a schematic view of the illumination system depicted in FIG. 1. With reference to FIG. 2, particularly, the illumination system 110 includes a light source 112 and a light processing module 114. The light processing module 114 includes a reflective wheel structure S and a driving unit 114a. The reflective wheel structure S includes a first reflective structure 114b and a second reflective structure 114c fixed to each other. In the embodiment, a rotation axis of the first reflective structure 114b is the same as a rotation axis of the second reflective structure 114c. For instance, the rotation axis may both be referred as rotation axis A. The first reflective structure 114b is, for instance, a reflective wavelength conversion wheel (e.g., a reflective phosphor wheel) and is located on a transmission path of an illumination beam LB emitted from the light source 112. The second reflective structure 114c is, for instance, a reflective color filter wheel and located on a transmission path of the illumination beam LB transmitted from the first reflective structure 114b. The driving unit 114a is connected to the first reflective structure 114b or the second reflective structure 114c (in FIG. 2, the driving unit 114a is connected to the first reflective structure 114b, for instance) and configured to drive the first reflective structure 114b and the second reflective structure 114c to rotate synchronously.

As described above, the first reflective structure 114b and the second reflective structure 114c are fixed to each other. Therefore, the light processing module 114 drives the first reflective structure 114b and the second reflective structure 114c to rotate synchronously by using a single driving unit 114a. Thereby, the projector 100 may drive the first reflective structure 114b and the second reflective structure 114c to rotate by using a single driving unit 114a without a high-level DLP conventionally used to synchronize the light source, the first reflective structure, the second reflective structure and the light valve, so as to reduce manufacturing costs.

In the embodiment, the first reflective structure 114b has a first reflective surface P1 and a first back surface P2 opposite to each other, and the second reflective structure 114c has a second reflective surface P3 and a second back surface P4 opposite to each other. The first reflective structure 114b and the second reflective structure 114c are fixed (e.g., adhered, engaged, locked) to each other by the first back surface P2 and the second back surface P4. The way of fixing the first reflective structure 114b to the second reflective structure 114c is not limited in the disclosure.

Particularly, in the embodiment, the first reflective structure 114b is a reflective wavelength conversion wheel, and the second reflective structure 114c is a reflective color filter wheel. In the embodiment, the light source 112 includes a blue light emitting unit 112a which is a blue light LD and is configured to emit a blue light, for instance. The invention is not limited thereto. According to the embodiment, the reflective wavelength conversion wheel (the first reflective structure 114b) has a first reflective region 114b1 and a wavelength conversion region 114b2, and the reflective color filter wheel (the second reflective structure 114c) has a second reflective region 114c1 and a color filter region 114c2. In the embodiment, the first reflective region 114b1 and the wavelength conversion region 114b2 are moved into the transmission path of the illumination beam LB together with the rotation of the first reflective structure 114b. For explanatory purposes, FIG. 2 shows schematically the first reflective region 114b1 being located on the transmission path of the illumination beam LB, though the wavelength conversion region 114b2 may also be located on the transmission path of the illumination beam LB in FIG. 2. Specifically, in the embodiment, when the first reflective region 114b1 is moved into the transmission path of the illumination beam LB as the first reflective structure 114b rotates (e.g., at a first timing), the first reflective region 114b1 is configured to reflect a first color light (the illumination beam LB, e.g., a blue light) emitted from the light source 112. According to the embodiment, when the wavelength conversion region 114b2 is moved into the transmission path (not shown) of the illumination beam LB as the first reflective structure 114b rotates (e.g., at a second timing), the wavelength conversion region 114b2 is configured to convert the first color light (the illumination beam LB, e.g., the blue light) emitted from the light source 112 into a second color light (an illumination beam LY, e.g., a yellow light shown as dotted lines) and reflect the second color light (the illumination beam LY, e.g., the yellow light). In the embodiment, the second reflective region 114c1 and the color filter region 114c2 are moved into the transmission path of the first color light (the illumination beam LB, e.g., the blue light) and the transmission path of the second color light (the illumination beam LY, e.g., the yellow light) respectively as the second reflective structure 114c rotates. For explanatory purposes, FIG. 2 shows the second reflective region 114c1 being located on the transmission path of the first color light (the illumination beam LB, e.g., the blue light), though the color filter region 114b2 may also be located on the transmission path of the second color light (the illumination beam LY, e.g., the yellow light) in FIG. 2. Specifically, according to the embodiment, when the second reflective region 114c1 is moved into the transmission path of the first color light (the illumination beam LB, e.g., the blue light) as the second reflective structure 114c rotates, the second reflective region 114c1 is configured to reflect the first color light (the illumination beam LB, e.g., the blue light) from the first reflective structure 114b. In the embodiment, when the color filter region 114c2 is moved into the transmission path of the second color light (the illumination beam LY, e.g., the yellow light) as the second reflective structure 114c rotates, the color filter region 114c2 is configured to filter the second color light (the illumination beam LY, e.g., the yellow light) from the first reflective structure 114b for a red light (not shown) or a green light (not shown) respectively, and reflect the red light and the green light. It is noted that the color filter region 114c2 reflects a required color (wavelength) light and absorbs a color (wavelength) light which is not required.

In the embodiment, as the first reflective structure 114b and the second reflective structure 114c rotate synchronously, the first reflective region 114b1 and the second reflective region 114c1 are respectively moved into the transmission path of the illumination beam LB and the transmission path of the first color light (the illumination beam LB, e.g., the blue light) at the same time, so that the first color light (the illumination beam LB, e.g., the blue light) from the first reflective region 114b1 may arrive at the second reflective region 114c1. Similarly, as the first reflective structure 114b and the second reflective structure 114c rotate synchronously, the wavelength conversion region 114b2 and the color filter region 114c2 are respectively moved into the transmission path of the illumination beam LB and the transmission path of the second color light (the illumination beam LY, e.g., the yellow light) at the same time, so that the second color light (the illumination beam LY, e.g., the yellow light) from the wavelength conversion region 114b2 may arrive at the color filter region 114c2.

In other embodiments, the wavelength conversion region 114b2 of the reflective wavelength conversion wheel (the first reflective structure 114b) is divided into two wavelength conversion sub-regions configured to convert the first color light (the illumination beam LB, e.g., the blue light) from the light source 112 respectively into a third color light (e.g., a red light with a relatively wide spectrum) and a fourth color light (e.g., a green light with a relatively wide spectrum). Correspondingly, the color filter region 114c2 of the reflective color filter wheel (the second reflective structure 114c) may be divided into two color filter sub-regions respectively configured to filter the third color light (e.g., the red light with the relatively wide spectrum) and the fourth color light (e.g., the green light with the relatively wide spectrum), so that the third color light (e.g., the red light with a relatively wide spectrum) and the fourth color light (e.g., the green light with the relatively wide spectrum) are respectively filtered into a required third color light with a required wavelength spectrum and a required fourth color light with a required wavelength spectrum, for example, with a relatively wide spectrum. The color filter region 114c2 reflects the required third color light and the required fourth color light to a light integration rod 114h, so as to homogenize the third color light (e.g., the red light) and the fourth color light (e.g., the green light). Within said design, as the first reflective structure 114b and the second reflective structure 114c rotate synchronously, the wavelength conversion sub-region corresponding to the third color light (e.g., the red light) and the color filter sub-region corresponding to the third color light (e.g., the red light) are respectively moved into the transmission path of the illumination beam LB and the transmission path of the third color light (e.g., the red light) at the same time, so that the third color light (e.g., the red light) from the wavelength conversion sub-region may arrive at the corresponding color filter sub-region. Similarly, as the first reflective structure 114b and the second reflective structure 114c rotate synchronously, the wavelength conversion sub-region corresponding to the fourth color light (e.g., the green light) and the color filter sub-region corresponding to the fourth color light (e.g., the green light) are respectively moved into the transmission path of the illumination beam LB and the transmission path of the fourth color light (e.g., the green light) at the same time, so that the fourth color light (e.g., the green light) from the wavelength conversion sub-region may arrive at the corresponding color filter sub-region.

In other embodiments, a diffuser structure may further be disposed at the first reflective region 114b1 of the reflective wavelength conversion wheel (the first reflective structure 114b), so as to further diffuse the first color light (the illumination beam LB, e.g., the blue light) from the light source 112 and avoid the laser speckle patterns.

Besides, in some embodiments, if the first color light (the illumination beam LB) from the light source 112 is a blue light slightly purple, the first reflective region 114b1 may further include a some amount of wavelength conversion material (doped or coated with a low concentration of the wavelength conversion material, or the wavelength conversion material is not densely distributed), and the wavelength conversion material may convert a portion of the first color light from the light source 112 into the third color light (e.g., a green light with a relatively wide spectrum), and the third color light may be reflected by the first reflective region 114b1 together with another portion of the first color light LB. In view of the above, the second reflective region 114c1 receives the first color light and the third color light from the first reflective region 114b1, and a color filter element may be disposed at the second reflective region 114c1 correspondingly. The color filter element is configured to filter the first color light (the blue light slightly purple) and the third color light (e.g., the green light with a relatively wide spectrum) from the first reflective region 114b1, so as to comply with a required blue light wavelength range. In detail, the color filter element corresponding to the second reflective region 114c1 may filter out (absorb) the first color light (the blue light slightly purple) with a short wavelength spectrum, while reflect the first color light with a long wavelength spectrum and the third color light with a short wavelength spectrum (the green light with a short wavelength spectrum), so as to adjust the color coordinate of the first color light (the illumination beam LB, e.g., the blue light) in the image beam L2.

With reference to FIG. 2, more particularly, in the embodiment, the light processing module 114 further includes a dichroic mirror 114d, an optical element 114e, reflective units 114f-114g, and a light integration rod 114h. In the embodiment, the dichroic mirror 114d is a dichroic mirror with yellow reflection (DMY) which reflects the second color light (the illumination beam LY, e.g., the yellow light) and allows light of other colors to pass through, for instance. In the embodiment, the dichroic mirror 114d is located on the transmission path of the first color light (the illumination beam LB, e.g., the blue light) emitted from the blue light emitting unit 112a. After passing through the dichroic mirror 114d, one portion of the first color light (the illumination beam LB, e.g., the blue light) is configured to be reflected by the first reflective region 114b1 of the first reflective structure 114b to the optical element 114e (e.g., the reflective unit). The optical element 114e (e.g., the reflective unit) reflects the portion of the first color light (the illumination beam LB, e.g., the blue light), so that the portion of the first color light (the illumination beam LB, e.g., the blue light) is transmitted toward the reflective unit 114f, reflected sequentially by the reflective units 114f and 114g, and then transmitted toward the second reflective structure 114c. The portion of the first color light (the illumination beam LB, e.g., the blue light) then is reflected by the second reflective region 114c1 of the second reflective structure 114c to the light integration rod 114h. In brief, after passing through the dichroic mirror 114d the first color light (the illumination beam LB, e.g., the blue light) is configured to be sequentially transmitted to the first reflective structure 114b and the second reflective structure 114c. On the other hand, in the embodiment, the wavelength conversion region 114b2 of the first reflective structure 114b is configured to convert one portion of the first color light (the illumination beam LB, e.g., the blue light) into the second color light (the illumination beam LY, e.g., the yellow light). The second color light (the illumination beam LY, e.g., the yellow light) is configured to be reflected by the dichroic mirror 114d and transmitted toward the reflective unit 114f. The second color light (the illumination beam LY, e.g., the yellow light) is then sequentially reflected by the reflective units 114f and 114g, transmitted toward the second reflective structure 114c, filtered by the color filter region 114c2 of the second reflective structure 114c, and then reflected to the light integration rod 114h.

Besides, with reference to FIG. 2, in other embodiments, the light source 112 further includes a secondary light source configured as a secondary light source for providing an illumination beam LR. The secondary light source is a red light emitting unit 112b for example, and the invention is not limited thereto. The red light emitting unit 112b is, for instance, a red light LD and configured to emit a red light, and the invention is not limited thereto. In other embodiments, the optical element 114e (e.g., a dichroic mirror) and the dichroic mirror 114d are, for instance, both located on a transmission path of the illumination beam LR (e.g., the red light) emitted from the red light emitting unit 112b. The dichroic mirror 114d is configured to allow the red light to pass through. The optical element 114e (e.g., the dichroic mirror) a dichroic mirror with blue reflection (DMB) which reflects the first color light (the illumination beam LB, e.g., the blue light), while allows light of other colors to pass through. After passing through the optical element 114e (e.g., the dichroic mirror) and the dichroic mirror 114d, the illumination beam LR (e.g., the red light) is reflected sequentially by the reflective units 114f and 114g, and transmitted to the second reflective structure 114c. The illumination beam LR (e.g., the red light) then is reflected by the second reflective structure 114c to the light integration rod 114h. In brief, the light integration rod 114h is located on the transmission path of the illumination beam LB/LY/LR transmitted from the second reflective structure 114c.

In the embodiment, with reference to FIG. 1 and FIG. 2, the light valve 120 is located on the transmission path of the illumination beam L1/LB/LY/LR transmitted from the second reflective structure 114c and configured to convert the illumination beam L1/LB/LY/LR from the second reflective structure 114c into the image beam L2.

In the embodiment, as described above, the illumination beam LB/LR/LY from one side of the reflective wheel structure S (i.e., the upper side of the reflective wheel structure S depicted in FIG. 2) is reflected by the two reflective units 114f and 114g to another side of the reflective wheel structure S (i.e., the lower side of the reflective wheel structure S). However, the invention is not limited thereto. In other embodiments, said reflection may be performed by a different number of reflective units. Besides, the arrangement of the red light emitting unit 112b may increase the intensity ratio of the red light in the illumination beam, and the invention is not limited thereto. In other embodiments, the red light emitting unit 112b may be replaced by another non-red/non-blue light emitting unit. Alternatively, the light source 112 may merely include the blue light emitting unit 112a, and the invention is not limited thereto.

According to the embodiment, the light processing module 114 further includes an optical element 114i. The optical element 114i includes a dichroic mirror that is configured to reflect the yellow light and allow other lights of other colors to pass through, for instance, and the optical element 114i includes a blue light transflective mirror. That is, the optical element 114i includes a DMY and a half mirror configured to reflect 50% of blue light and allow the other 50% of blue light to pass through. The optical element 114i is located on the transmission path of the first color light (the illumination beam LB, e.g., the blue light) and the transmission path of the second color light (the illumination beam LY, e.g., the yellow light) transmitted from the first reflective structure 114b. The second color light (the illumination beam LY, e.g., the yellow light) transmitted from the first reflective structure 114b is reflected by the optical element 114i and transmitted toward the reflective unit 114f, then sequentially reflected by the reflective units 114f and 114g, and transmitted toward the second reflective structure 114c. One portion (e.g., 50%) of the first color light (the illumination beam LB, e.g., the blue light) from the first reflective structure 114b is reflected by the optical element 114i and transmitted toward the reflective unit 114f, then sequentially reflected by the reflective units 114f and 114g, and transmitted toward the second reflective structure 114c. Besides, another portion (e.g., 50%) of the first color light (the illumination beam LB, e.g., the blue light) from the first reflective structure 114b passes through the optical element 114i and arrives at the optical element 114e, then is reflected by the optical element 114e and transmitted toward the reflective unit 114f. The another portion (e.g., 50%) of the first color light (the illumination beam LB, e.g., the blue light) then is sequentially reflected by the reflective units 114f and 114g, and transmitted toward the second reflective structure 114c. Due to the configuration of the optical element 114i, the first color light (the illumination beam LB, e.g., the blue light) arriving at the reflective unit 114f and transmitted thereafter may be distributed more evenly.

Figure 3:
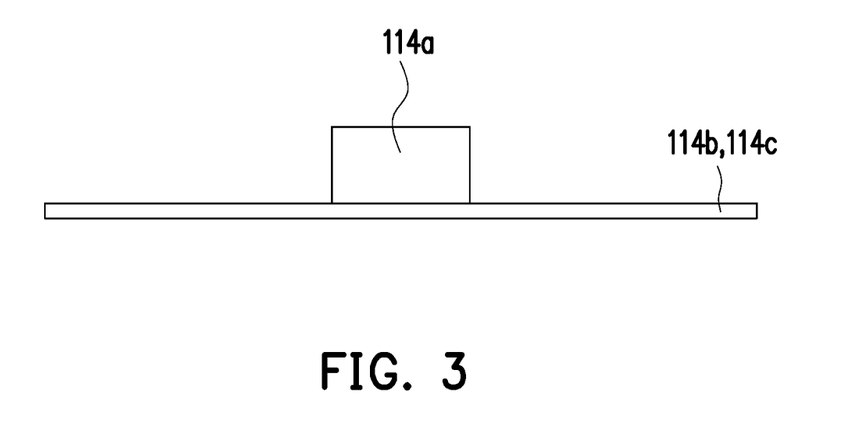
FIG. 3 is a schematic view of a driving unit and a reflective wheel structure according to another embodiment of the invention.

FIG. 3 is a schematic view of a driving unit and a reflective wheel structure according to another embodiment of the invention. The difference between the embodiment shown in FIG. 3 and the embodiment shown in FIG. 2 lies in that the first reflective structure 114b and the second reflective structure 114c may be integrally formed into a single substrate as shown in FIG. 3. For example, a wavelength conversion layer and a color filter layer are formed on two opposite surfaces of the substrate, so as to respectively form the first reflective structure 114b and the second reflective structure 114c.

Figure 4:
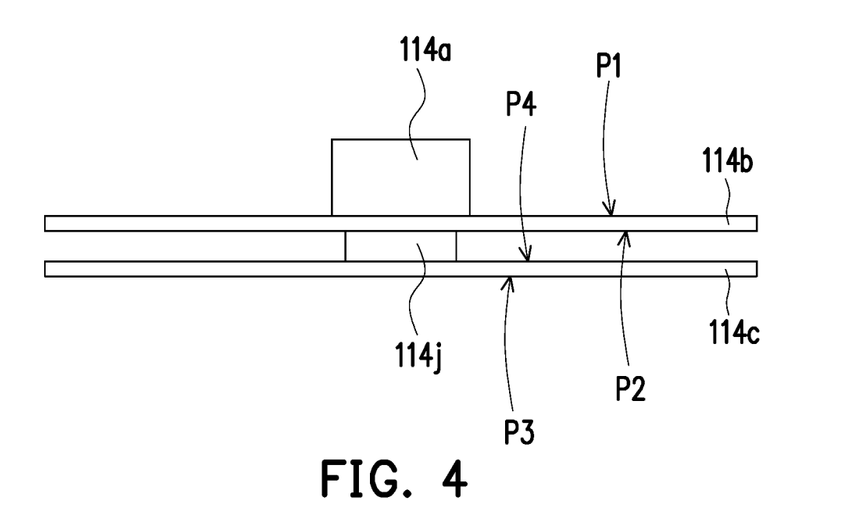
FIG. 4 is a schematic view of a driving unit and a reflective wheel structure according to another embodiment of the invention.

FIG. 4 is a schematic view of a driving unit and a reflective wheel structure according to another embodiment of the invention. The difference between the embodiment shown in FIG. 4 and the embodiment shown in FIG. 2 lies in that the reflective wheel structure S may further include a connecting member 114j. The connecting member 114j is connected between a first back surface P2 of the first reflective structure 114b and a second back surface P4 of the second reflective structure 114c, so as to ensure that a gap exists between the first back surface P2 of the first reflective structure 114b and the second back surface P4 of the second reflective structure 114c, thereby enhancing the heat dissipation of the reflective wheel structure S.

Figure 5:
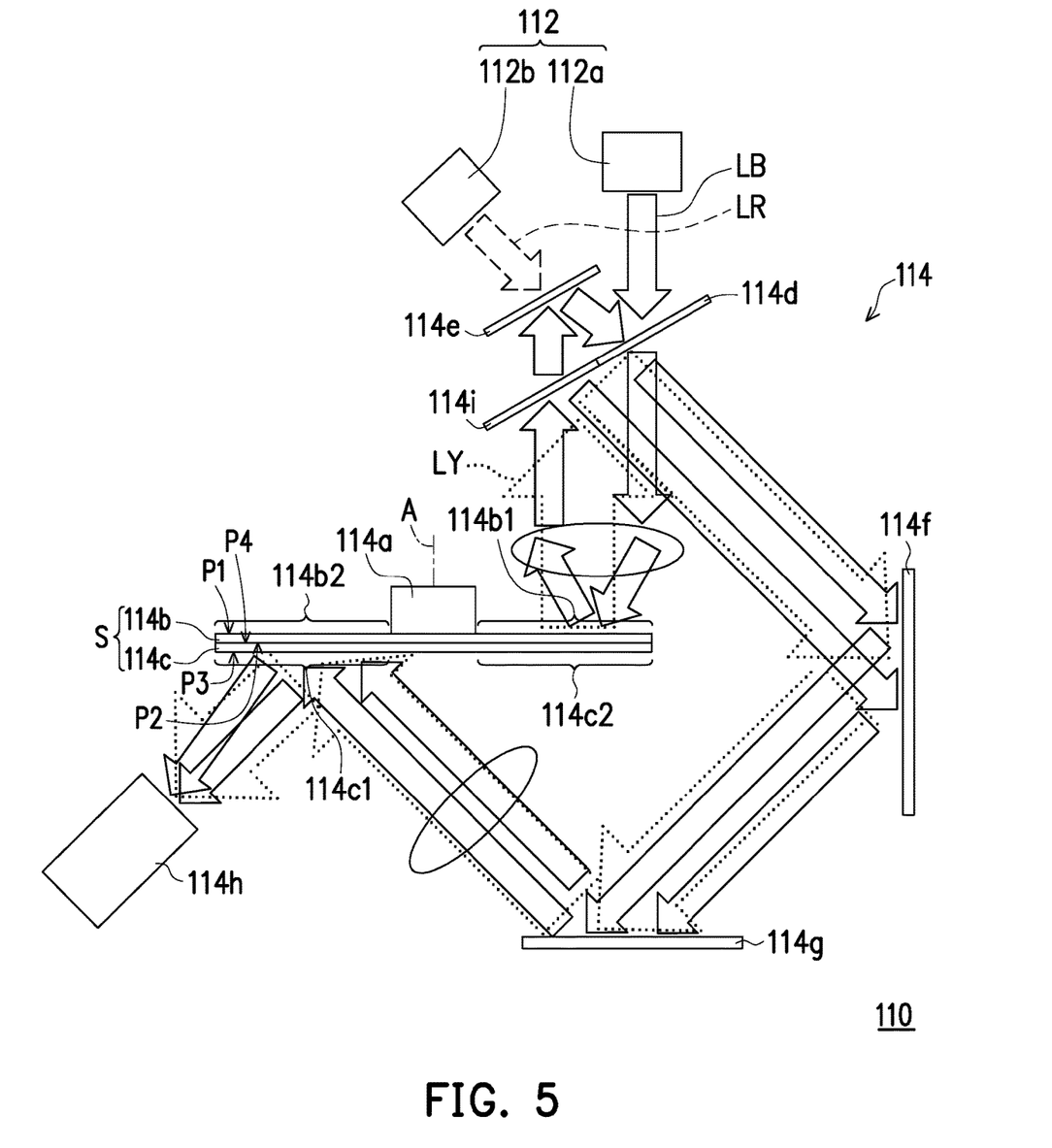
FIG. 5 is a schematic view of an illumination system according to another embodiment of the invention.

FIG. 5 is a schematic view of an illumination system according to another embodiment of the invention. The difference between the embodiment shown in FIG. 5 and the embodiment shown in FIG. 2 lies in that the wavelength conversion region 114b2 and the color filter region 114c2 depicted in FIG. 2 are aligned to each other, and the first reflective region 114b1 and the second reflective region 114c1 depicted in FIG. 2 are aligned to each other, while in FIG. 5, the wavelength conversion region 114b2 and the color filter region 114c2 are misaligned with each other, and the first reflective region 114b1 and the second reflective region 114c1 shown in FIG. 5 are misaligned with each other. The location of the reflective unit 114g shown in FIG. 5 is correspondingly adjusted, such that the wavelength conversion region 114b2 and the color filter region 114c2 are synchronized at the time sequence (e.g., at a third timing) and the first reflective region 114b1 and the second reflective region 114c1 are synchronized at the time sequence (e.g., at a fourth timing). In the design shown in FIG. 5, the possibility that the illumination beam simultaneously irradiates the upper side and the lower side of the same region in the reflective wheel structure S is relieved, thereby enhancing the heat dissipation on the reflective wheel structure S.

Figure 6:
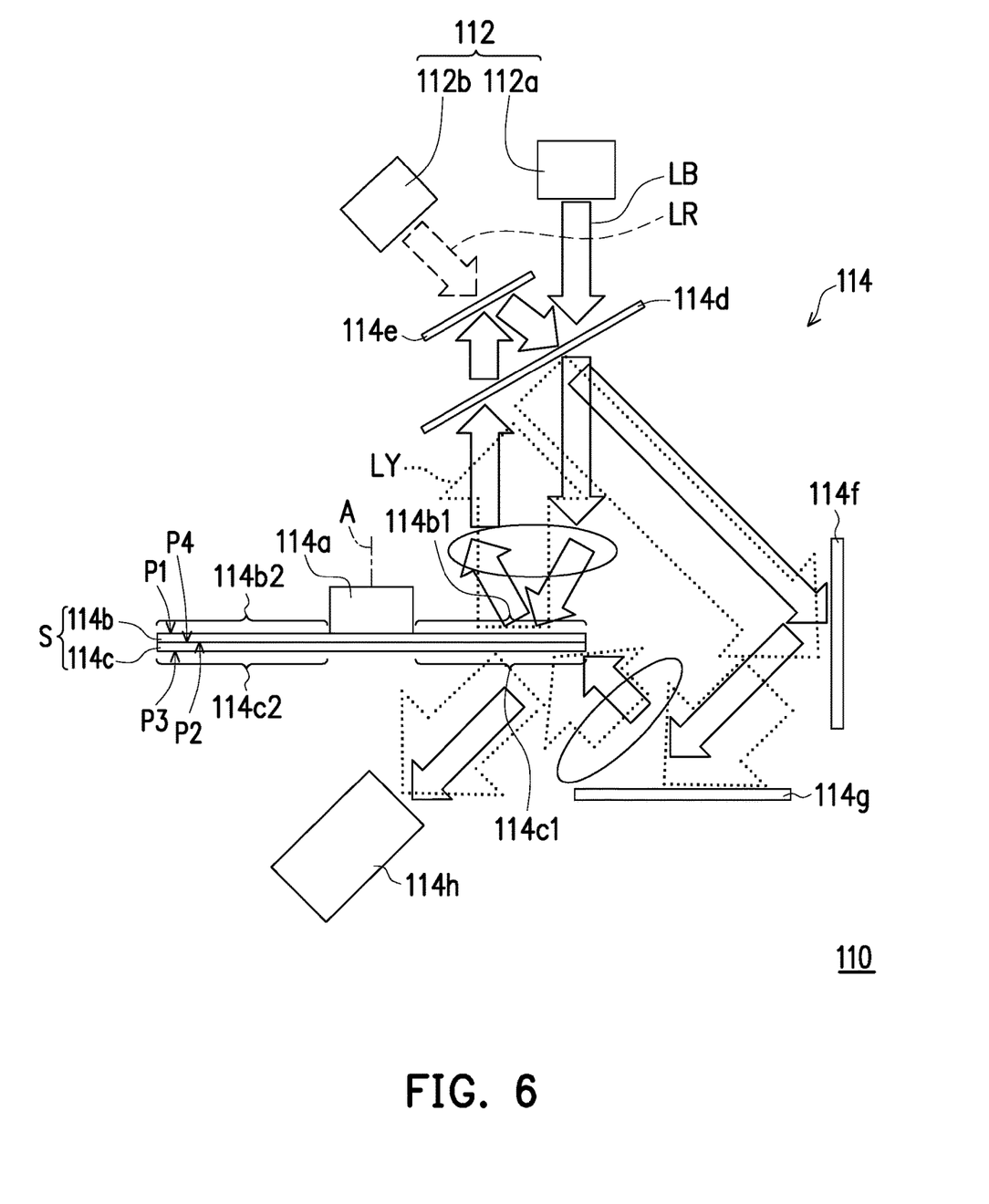
FIG. 6 is a schematic view of an illumination system according to another embodiment of the invention.

FIG. 6 is a schematic view of an illumination system according to another embodiment of the invention. The difference between the embodiment shown in FIG. 6 and the embodiment shown in FIG. 2 lies in that the optical element 114i depicted in FIG. 2 is replaced by the dichroic mirror 114d in FIG. 6. Thereby, the first color light (the illumination beam LB, i.e., the blue light) from the first reflective structure 114b may completely pass through the dichroic mirror 114d, may arrive at the optical element 114e, may be reflected by the optical element 114e, and may then be transmitted toward the reflective unit 114f.

Figure 7:
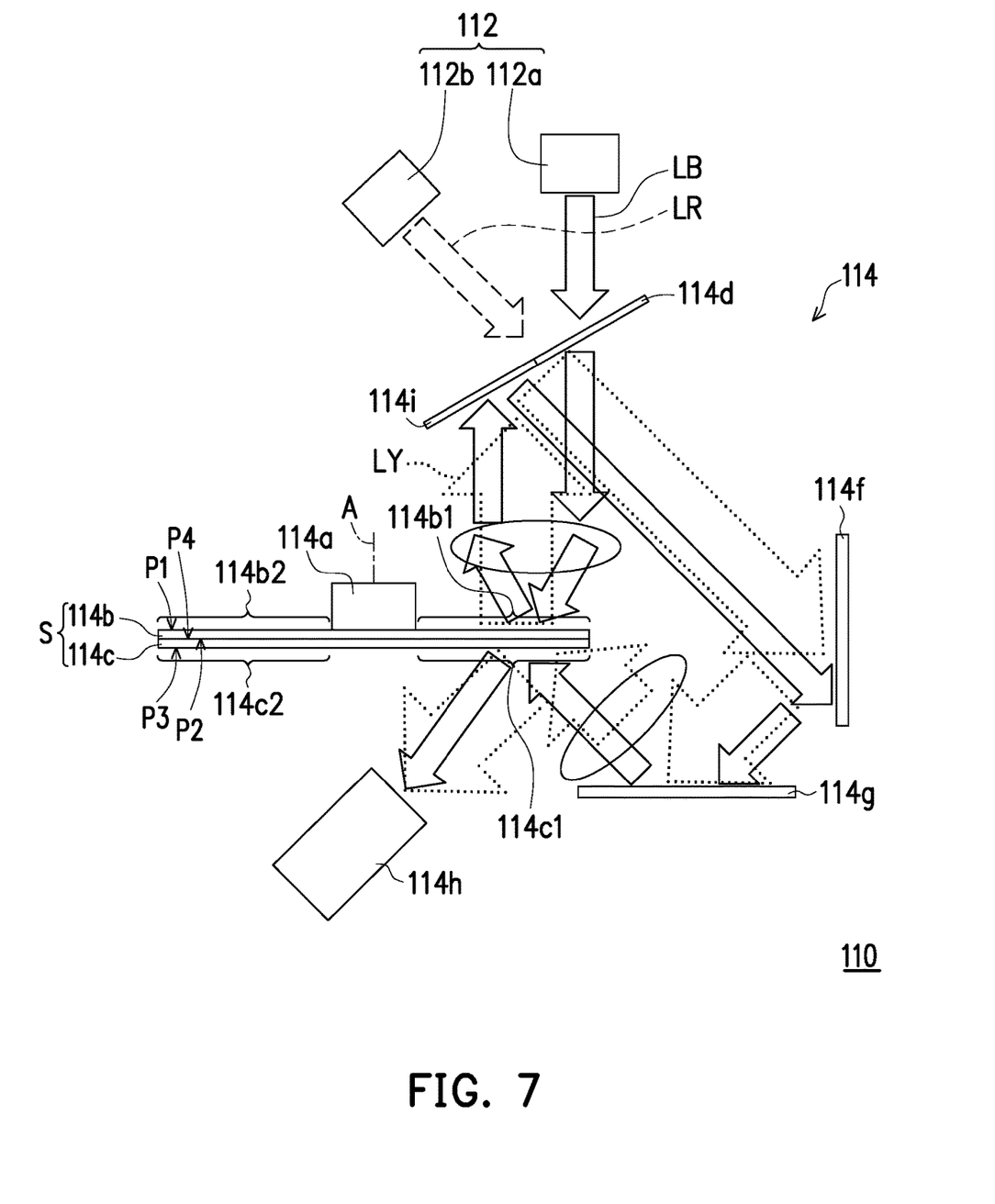
FIG. 7 is a schematic view of an illumination system according to another embodiment of the invention.

FIG. 7 is a schematic view of an illumination system according to another embodiment of the invention. The difference between the embodiment shown in FIG. 7 and the embodiment shown in FIG. 2 lies in that the optical element 114i depicted in FIG. 7 is configured to reflect the blue light and does not allow the blue light to penetrate. Thereby, the first color light (the illumination beam LB, i.e., the blue light) from the first reflective structure 114b is completely reflected by the optical element 114i, arrives at the optical element 114e, is reflected by the optical element 114e, and is then transmitted toward the reflective unit 114f. By the configuration of elements shown in FIG. 7, the optical element 114e configured to reflect the first color light (the illumination beam LB, e.g., the blue light) as shown in FIG. 2 may be omitted from FIG. 7.

In the previous embodiments, the light emitting unit is exemplified by a LD, and the invention is not limited thereto. In other embodiments, the light emitting unit may also be a light emitting diode (LED) or any other appropriate light emitting devices.

To sum up, one or more embodiments provided above have at least one of the following advantages or achieve at least one of the following effects. Since the first reflective structure and the second reflective structure provided in one or more embodiments of the invention are fixed to each other, the light processing module may synchronously drive the first reflective structure and the second reflective structure to rotate by using a single driving unit. As such, the projector provided in one or more embodiments of the invention may drive the first reflective structure and the second reflective structure to rotate by using a single driving unit without a high-level DLP conventionally used to synchronize the light source, the first reflective structure, the second reflective structure and the light valve, so as to reduce the manufacturing costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
    an illumination system, comprising a light source and a light processing module;
    a light valve; and
    a projection lens,
    wherein the light source is configured to provide an illumination beam, and the light processing module comprises a reflective wheel structure and a driving unit,
    wherein the reflective wheel structure comprises a first reflective structure and a second reflective structure, the first reflective structure is located on a transmission path of the illumination beam emitted from the light source, and the second reflective structure is located on a transmission path of the illumination beam transmitted from the first reflective structure,
    wherein the driving unit is connected to the first reflective structure and the second reflective structure and configured to drive the first reflective structure and the second reflective structure to rotate synchronously,
    wherein the light valve is located on the transmission path of the illumination beam transmitted from the second reflective structure and configured to convert the illumination beam transmitted from the second reflective structure into an image beam,
    wherein the projection lens is located on a transmission path of the image beam,
    wherein the first reflective structure is a reflective wavelength conversion wheel, and the second reflective structure is a reflective color filter wheel, and
    wherein the reflective wavelength conversion wheel has a first reflective region and a wavelength conversion region, the reflective color filter wheel has a second reflective region and a color filter region, the first reflective region is configured to reflect a first color light, the wavelength conversion region is configured to convert the first color light into at least one second color light, the second reflective region is configured to reflect the first color light, the color filter region is configured to reflect the second color light, the first reflective region and the second reflective region are configured to be moved into the transmission path of the illumination beam together with a synchronous rotation of the first reflective structure and the second reflective structure, and the wavelength conversion region and the color filter region are configured to be moved into the transmission path of the illumination beam together with the synchronous rotation of the first reflective structure and the second reflective structure.

2. The projector of claim 1, wherein the wavelength conversion region and the color filter region are misaligned with each other or aligned to each other, and the first reflective region and the second reflective region are misaligned with each other or aligned to each other.

3. The projector of claim 1, wherein the first reflective region includes a wavelength conversion material, a color filter element is disposed at the second reflective region, the wavelength conversion material is configured to convert a portion of the first color light into a third color light, and the color filter element is configured to filter the first color light and the third color light.

4. The projector of claim 1, wherein the light processing module further comprises at least one reflective unit configured to reflect the illumination beam from one side of the reflective wheel structure to another side of the reflective wheel structure.

5. The projector of claim 1, wherein the first reflective structure and the second reflective structure are integrally formed.

6. The projector of claim 1, wherein the first reflective structure has a first reflective surface and a first back surface opposite to each other, the second reflective structure has a second reflective surface and a second back surface opposite to each other, the first reflective structure and the second reflective structure are fixed to each other by the first back surface and the second back surface.

7. The projector of claim 6, wherein the reflective wheel structure further comprises a connecting member connected between the first back surface and the second back surface, so as to form a gap between the first back surface and the second back surface.

8. The projector of claim 1, wherein a rotation axis the first reflective structure is the same as a rotation axis of the second reflective structure.

9. A projector, comprising:
    an illumination system, comprising a light source and a light processing module;
    a light valve; and
    a projection lens,
    wherein the light source is configured to provide an illumination beam, and the light processing module comprises a reflective wheel structure and a driving unit,
    wherein the reflective wheel structure comprises a first reflective structure and a second reflective structure, the first reflective structure is located on a transmission path of the illumination beam emitted from the light source, and the second reflective structure is located on a transmission path of the illumination beam transmitted from the first reflective structure,
    wherein the driving unit is connected to the first reflective structure and the second reflective structure and configured to drive the first reflective structure and the second reflective structure to rotate synchronously,
    wherein the light valve is located on the transmission path of the illumination beam transmitted from the second reflective structure and configured to convert the illumination beam transmitted from the second reflective structure into an image beam,
    wherein the projection lens is located on a transmission path of the image beam,
    wherein the light source comprises a blue light emitting unit, the light processing module further comprises a dichroic mirror, the dichroic mirror is located on a transmission path of a blue light emitted from the blue light emitting unit, the blue light is configured to be sequentially transmitted to the first reflective structure and the second reflective structure after passing through the dichroic mirror, the first reflective structure is configured to convert the blue light into a yellow light, and the yellow light is configured to be reflected by the dichroic mirror and transmitted toward the second reflective structure.

10. The projector of claim 9, wherein the light processing module further comprises at least one reflective unit, the first reflective structure is configured to reflect the blue light to the at least one reflective unit, and the at least one reflective unit reflects the blue light to transmit the blue light toward the second reflective structure.

11. The projector of claim 9, wherein the light source further comprises a red light emitting unit, the dichroic mirror is located on a transmission path of a red light emitted from the red light emitting unit, and the red light is configured to be transmitted to the second reflective structure after passing through the dichroic mirror.

12. The projector of claim 1, wherein the light processing module further comprises a light integration rod located on the transmission path of the illumination beam transmitted from the second reflective stricture.

13. An illumination system, comprising:
a light source and a light processing module,
wherein the light source is configured to provide an illumination beam, and the light processing module comprises a reflective wheel structure and a driving unit,
wherein the reflective wheel structure comprises a first reflective structure and a second reflective structure, the first reflective structure is located on a transmission path of the illumination beam emitted from the light source, and the second reflective structure is located on a transmission path of the illumination beam transmitted from the first reflective structure,
wherein the driving unit is connected to the first reflective structure or the second reflective structure and configured to drive the first reflective structure and the second reflective structure to rotate synchronously,
wherein the first reflective structure is a reflective wavelength conversion wheel, and the second reflective structure is a reflective color filter wheel, and
wherein the reflective wavelength conversion wheel has a first reflective region and a wavelength conversion region, the reflective color filter wheel has a second reflective region and a color filter region, the first reflective region is configured to reflect a first color light, the wavelength conversion region is configured to convert the first color light into at least one second color light, the second reflective region is configured to reflect the first color light, the color filter region is configured to reflect the second color light, the first reflective region and the second reflective region are configured to be moved into the transmission path of the illumination beam together with a synchronous rotation of the first reflective structure and the second reflective structure, and the wavelength conversion region and the color filter region are configured to be moved into the transmission path of the illumination beam together with the synchronous rotation of the first reflective structure and the second reflective structure.

14. The illumination system of claim 13, wherein the wavelength conversion region and the color filter region are misaligned with each other or aligned to each other, and the first reflective region and the second reflective region are misaligned with each other or aligned to each other.

15. The illumination system of claim 13, wherein the first reflective region includes a wavelength conversion material, a color filter element is disposed at the second reflective region, the wavelength conversion material is configured to convert a portion of the first color light into a third color light, and the color filter element is configured to filter the first color light and the third color light.

16. The illumination system of claim 13, wherein the light processing module further comprises at least one reflective unit configured to reflect the illumination beam from one side of the reflective wheel structure to another side of the reflective wheel structure.

17. The illumination system of claim 13, wherein the first reflective structure and the second reflective structure are integrally formed.

18. The illumination system of claim 13, wherein the first reflective structure has a first reflective surface and a first back surface opposite to each other, the second reflective structure has a second reflective surface and a second back surface opposite to each other, and the first reflective structure and the second reflective structure are fixed to each other by the first back surface and the second back surface.

19. The illumination system of claim 18, wherein the reflective wheel structure comprises a connecting member connected between the first back surface and the second back surface, so as to form a gap between the first back surface and the second back surface.

20. The illumination system of claim 13, wherein a rotation axis of the first reflective structure is the same as a rotation axis of the second reflective structure.

21. The illumination system of claim 13, wherein the light source comprises a blue light emitting unit, the light processing module further comprises a dichroic mirror located on a transmission path of a blue light emitted from the blue light emitting unit, the blue light is configured to be sequentially transmitted to the first reflective structure and the second reflective structure after passing through the dichroic mirror, the first reflective structure is configured to convert the blue light into a yellow light, and the yellow light is configured to be reflected by the dichroic mirror to be transmitted toward the second reflective structure.

22. The illumination system of claim 21, wherein the light processing module further comprises at least one reflective unit, the first reflective structure is configured to reflect the blue light to the at least one reflective unit, and the at least one reflective unit reflects the blue light to transmit the blue light toward the second reflective structure.

23. The illumination system of claim 21, wherein the light source further comprises a red light emitting unit, the dichroic mirror is located on a transmission path of a red light emitted from the red light emitting unit, and the red light is configured to be transmitted to the second reflective structure after passing through the dichroic mirror.

24. The illumination system of claim 13, wherein the light processing module further comprises a light integration rod located on the transmission path of the illumination beam transmitted from the second reflective structure.

\* \* \* \* \*